(12) United States Patent
Helberg

(10) Patent No.: US 12,404,181 B2
(45) Date of Patent: Sep. 2, 2025

(54) SEPARATION OF BACL2 FROM CACL2 BRINE SOLUTION

(71) Applicant: THE CHEMOURS COMPANY FC, LLC, Wilmington, DE (US)

(72) Inventor: Lisa E. Helberg, Middletown, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 727 days.

(21) Appl. No.: 17/625,594

(22) PCT Filed: Jul. 16, 2020

(86) PCT No.: PCT/US2020/042256
§ 371 (c)(1),
(2) Date: Jan. 7, 2022

(87) PCT Pub. No.: WO2021/011730
PCT Pub. Date: Jan. 21, 2021

(65) Prior Publication Data
US 2022/0281754 A1 Sep. 8, 2022

Related U.S. Application Data

(60) Provisional application No. 62/875,120, filed on Jul. 17, 2019.

(51) Int. Cl.
| C01F 11/32 | (2006.01) |
| B01D 15/08 | (2006.01) |
| B01J 20/06 | (2006.01) |
| B01J 20/28 | (2006.01) |
| B01J 20/282 | (2006.01) |

(52) U.S. Cl.
CPC .............. *C01F 11/32* (2013.01); *B01D 15/08* (2013.01); *B01J 20/06* (2013.01); *B01J 20/28016* (2013.01); *B01J 20/28061* (2013.01); *B01J 20/282* (2013.01); *B01J 2220/52* (2013.01)

(58) Field of Classification Search
CPC ..... B01D 15/08; B01J 20/06; B01J 20/28016; B01J 20/28061; B01J 20/282; B01J 2220/52; C01F 11/005; C01F 11/24; C01F 11/32
See application file for complete search history.

(56) References Cited

U.S. PATENT DOCUMENTS

| 3,332,737 A | 7/1967 | Kraus |
| 3,382,034 A | 5/1968 | Kraus |
| 3,522,187 A | 7/1970 | Kraus |
| 4,855,059 A * | 8/1989 | Frianeza-Kullberg ...................... C01D 3/145 210/687 |
| 5,618,437 A | 4/1997 | Ulan et al. |
| 5,769,906 A * | 6/1998 | Kremer .................... C21D 1/46 23/302 R |

(Continued)

OTHER PUBLICATIONS

Fard et al. Chemical Engineering Journal 2017, 317, 331-342 (Year: 2017).*

(Continued)

*Primary Examiner* — Sally A Merkling
*Assistant Examiner* — Jordan W Taylor

(57) ABSTRACT

The present invention relates to a process for separating $BaCl_2$ from a $CaCl_2$ brine solution.

14 Claims, 2 Drawing Sheets

(56) References Cited

U.S. PATENT DOCUMENTS

| | | | |
|---|---|---|---|
| 6,309,621 B1* | 10/2001 | Abe | C01F 11/24 |
| | | | 423/474 |
| 2006/0091078 A1 | 5/2006 | Meng et al. | |
| 2006/0091079 A1* | 5/2006 | Meng | B01J 20/0211 |
| | | | 210/688 |
| 2017/0225968 A1 | 8/2017 | Gaur et al. | |

OTHER PUBLICATIONS

Pochard et al. Journal of Colloid and Interface Science 2002, 255, 27-35 (Year: 2002).*
Myers et al. Research and Technology, American Water Works Association, 1985, 60-66 (Year: 1985).*
Mu et al. (Dalton Trans., 2018, 47, 8375) (Year: 2018).*
Koryukova, et al. "A Uniform Method of Sorption Purification of Solutions to Remove Heavy and Non-Ferrous Metal Impurities", 1989, 4 Pages, UDK 546.824-31:66.081:54.183.24.
Bang et al., "Removal of Arsenic From Groundwater by Granular Titanium Dioxide Absorbent", Chemosphere 60 (2005) 389-397, WWW.ELSEVIER.COM/LOCATE/CHEMOSPHERE.

* cited by examiner

SEPARATION OF BACL2 FROM CACL2 BRINE SOLUTION

CROSS REFERENCE TO RELATED APPLICATIONS

This application is a national filing under 35 U.S. C. 371 of International Application No. PCT/US2020/042256 filed Jul. 16, 2020, and claims the benefit of priority of U.S. Provisional Application No. 62/875,120 filed Jul. 17, 2019, the disclosures of which are incorporated herein by reference in its entirety.

FIELD OF THE INVENTION

Background of the Invention $CaCl_2$ is a widely used industrial chemical. It is produced primarily from three process routes: purification of natural $CaCl_2$ brines, neutralization of HCl with $CaCO_3$, or the Solvay Process which converts NaCl and $CaCO_3$ into $Na_2CO_3$ and $CaCl_2$. Each of these routes has advantages and disadvantages. $CaCl_2$ brine can be used directly in some applications or converted to a solid hydrated or anhydrous product. The $CaCl_2$ solutions are used in multiple industries including road de-icing, dust control, oil field production, cooling units or food applications. Each application has different quality requirements, but in the United States most require meeting Universal Treatment Standards (UTS) quality such as for road de-icing and oil field applications (see 40 CFR § 268.48—Universal Treatment Standards).

Acidic chloride streams are found as the by-product in many types of industrial scale processes. Neutralization of these streams with $Ca(OH)_2$, $CaCO_3$ or CaO has the opportunity to produce new sources of valuable $CaCl_2$ brine if the correct quality requirements can be met for the end use. One example is the iron chloride co-product stream produced from the Chloride Process in the manufacturing of $TiO_2$.

In the Chlorination step of the Chloride $TiO_2$ process, a ferrotitanium ore is chlorinated with a mixture of $Cl_2$, coke and heat to form $TiCl_4$ and a mixture of the other chlorinated metals that were present in the original ore. The composition of this mixture depends on the type of ore used such as ilmenite, slags or leucoxines, and the unique impurities in each ore body. These iron chlorides and other impurities are mixed with water to form a low pH aqueous solution. One of the options for this aqueous solution is to neutralize with a calcium base such as $Ca(OH)_2$ which leads to the formation of a iron hydroxide solid and a neutral or basic $CaCl_2$ stream. The majority of the impurities from the original iron chloride mixture are quantitatively removed from the resulting $CaCl_2$ brine solution.

From the UTS list of elements, one species of concern is Ba present as $BaCl_2$ in the $CaCl_2$ produced from this neutralization route. Ba is frequently an element of concern for quality in other neutralizations as well as in naturally occurring brine sources since the chemistry of Ba and Ca are similar.

Crystallization of the $CaCl_2$ would allow for separation of the $BaCl_2$ to meet the UTS standards, but this process is energy intensive and would reduce the savings and increase the capital requirements. For applications where a solid $CaCl_2$ product is not required, production of a suitable $CaCl_2$ solution through direct separation of the $BaCl_2$ in solution would allow for the potential of direct sales into UTS markets without crystallization. This separation directly from solution is very challenging due to the chemical similarities between Ba and Ca.

Crystallization and washing is a known solution for purifying $CaCl_2$. The separation of Ba and Ca ions from aqueous solution can be accomplished using ion exchange resin, but this technique cannot be applied to remove Ba ions from a Ca ion solution ($CaCl_2$ brine) because of the overwhelming Ca concentration and the ion exchange resin removes both types of +2 ions. $CaCl_2$ solution with $BaCl_2$ can be treated with $CaSO_4$ to form the less soluble $BaSO_4$ which can be removed from the $CaCl_2$ solution by filtration. This filtration is challenging due to the fine particle size of the $BaSO_4$ formed and its preference to form deposits inside process equipment. Additionally, this treatment does not allow the UTS goals to be met due to the solubility limits of $BaSO_4$ in $CaCl_2$. The presence of residual $BaSO_4$ in $CaCl_2$ product can also cause issues in use when the $CaCl_2$ solution is diluted because the solubility of $BaSO_4$ goes down and will precipitate, leaving residue build-up in process equipment.

BRIEF SUMMARY OF THE INVENTION

The invention results in a surprising adsorption of the $BaCl_2$ directly from $CaCl_2$ containing brine using a titanium containing material.

The invention comprises a method for purifying $CaCl_2$ brine containing $BaCl_2$. The method comprises the steps of contacting a $CaCl_2$ brine containing at least some $BaCl_2$ with a titanium containing material. Upon contacting the $CaCl_2$ brine with the titanium containing material, $BaCl_2$ is removed from the brine.

DETAILED DESCRIPTION OF THE INVENTION

Figure 1:
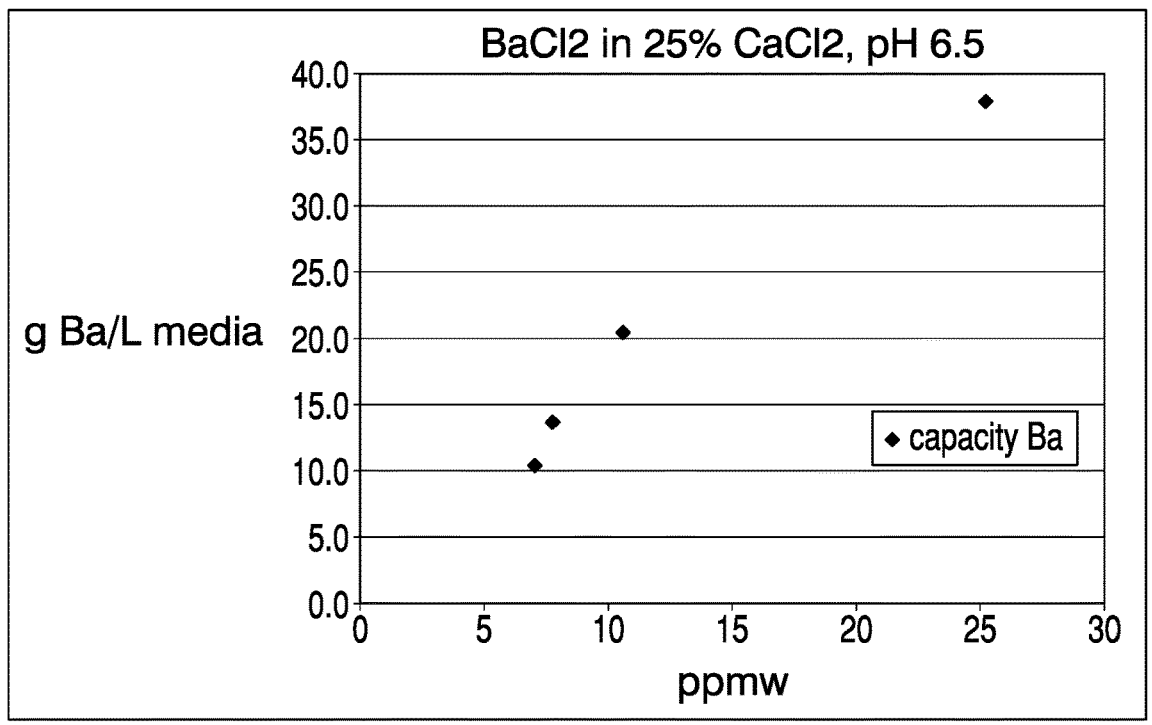
FIG. 1 is a graph showing the concentration of Metsorb® HMRG granules used in Example 1.

The invention results in a surprising adsorption of the $BaCl_2$ directly from $CaCl_2$ using a titanium containing material.

The invention comprises a method for purifying $CaCl_2$ brine containing $BaCl_2$. The method comprises the steps of contacting a $CaCl_2$ brine containing at least some $BaCl_2$ with a titanium containing material. Upon contacting the $CaCl_2$ brine with the titanium containing material the $BaCl_2$ is removed from the brine.

The titanium containing material can be contacted with the $CaCl_2$ brine in any suitable manner and under any conditions that will result in the removal of at least some $BaCl_2$ from the $CaCl_2$ brine. For example, the titanium containing material can be mixed into or with the $CaCl_2$ brine in a sufficient quantity to result in removal of at least some $BaCl_2$. Suitable weight ratios of the material are, for example, between 0.1 wt % and 5 wt % for batch separations. More preferable for batch separations is contacting the CaCl$_2$ brine with sequential dosing such as practiced in a resin in pulp configuration known to one skilled in the art. The contacting can also be done using a granular form of the titanium material in a column where the CaCl$_2$ brine is passed through a fixed bed either downflow or upflow with a suitable contact time controlled by the flow rate to allow the adsorption of the BaCl$_2$.

In an aspect of the invention the CaCl$_2$ brine solution has a concentration between about 10% to about 30% CaCl$_2$ at ambient temperature, based on the total weight of the brine solution.

In an aspect of the invention the CaCl$_2$ brine solution is contacted with the titanium containing material at a temperature between about 10° C. to about 75° C. In a further aspect of the invention the CaCl$_2$ brine solution is contacted with the titanium containing material at a temperature between about 20° C. to about 65° C.

The titanium containing material can be hydrated. Moreover, the titanium containing material can comprise TiO$_2$ or Ti(OH)$_4$, or a combination thereof. The titanium containing material can be provided in any suitable form, such as granual or powders, or a combination thereof.

Combining the titanium containing material with the brine is typically done at ambient pressure and temperature. The brine can be at any suitable pH. In an aspect of the invention the pH is in the range of from about 3 to about 9. In a further aspect of the invention the pH is in the range of from about 5.9 to about 6.9. In a still further aspect of the invention, the brine is at a pH of about 6.5.

The titanium containing material can be in any suitable form. When the titanium containing material is granules, the granules can have a particle size distribution suitable for loading into a column and passing an appropriate flow of the CaCl$_2$ of the desired concentration through the fixed bed with minimal backpressure. An example of a suitable size would be −16 mesh to 60 mesh material. Other suitable sizes that could be used in commercial equipment such as 8×30 or 12×40 are equally appropriate with the understanding of the relationship between the average surface area and capacity in service. In an aspect of the invention the titanium containing material can have an surface area above 180 m$^2$/g.

In one aspect of the invention, the titanium containing material is a titanium containing material sold under the tradename Metsorb® HMRG Granular Media produced by Graver Technologies, Inc., located at 200 Lake Drive, Glasgow, DE 19702. Metsorb® HMRG is a hydrated titanium form sold commercially to remove heavy metals such as arsenic and lead from drinking water. Metsorb® HMRG is a crystalline titanium oxide (TiO$_2$) (anatase) with a moisture content of less than 7%, a particle size of from −16 mesh to +60 mesh, with a surface area of from 200-240 m$^2$/g, a bulk density of 0.65 gram per cc (40 lbs./ft$^3$), a pore volume of from 0.34 to 0.44 cm$^3$/g, and an average pore size of from 64 to 84 Angstroms.

The titanium containing material can be contacted with the brine using any suitable method, such as mixing together, or by passing the brine through a column containing the titanium containing material. In an aspect of the invention, the column is of a suitable dimension and is packed with the Metsorb® HMRG granules. The CaCl$_2$ can be passed downflow through the packed bed with a suitable contacting time, under ambient pressure and temperature.

EXAMPLES

Example 1

A 25% CaCl$_2$ brine solution at pH 6.5 is spiked with 324 ppmw Ba as BaCl$_2$. The solution is divided into equal portions and contacted with differing amount of the Metsorb® HMRG granules. No wetting of the granules is required prior to contacting with the CaCl$_2$ solution. The solution is allowed to stir at room temperature for 24 hours, and the resulting concentrations of Ba in the product solutions are measured.

Table 1. Summary of Conditions and Results from the Treatment of 25% CaCl$_2$ solution at pH 6.5 with Different Concentrations of Metsorb® HMRG granules.

TABLE 1

| Media weight (g) | Starting Measured Ba concentration (ppm) | End Measured Ba concentration (ppm) | Calculated capacity (g Ba/L media) |
|---|---|---|---|
| 1.0344 | 324 | 25.2 | 37.84 |
| 2.0064 | 324 | 10.6 | 20.48 |
| 3.0287 | 324 | 7.77 | 13.74 |
| 4.0471 | 324 | 7.07 | 10.35 |

These concentrations are used to prepare the isotherm graph shown in FIG. 1. From the isotherm, an equilibrium capacity for the Ba can be calculated to be 47 g Ba/L Metsorb® HMRG granules for a starting 30 ppmw solution. This amount of capacity is well into the region that could make a commercially viable separation depending on the specifics of the process.

FIG. 1 shows an example of equilibrium removal of BaCl$_2$ from a 25% CaCl$_2$ solution at room temperature and pH 6.5 with Metsorb® HMRG granules.

Example 2

In a second example, following the same procedure as the results shown in Table 1 for Example 1, the starting CaCl$_2$ concentration is reduced from 25% to 10% CaCl$_2$. This example demonstrates that the concentration of the CaCl$_2$ solution has an impact on the capacity with higher CaCl$_2$ leading to lower capacity; however, the separation still occurs with significant removal. If the lower capacity is due to the higher viscosity leading to a lower mass transfer rate, higher contact time could increase capacity.

Table 2. Summary of Conditions and Results from the Treatment of 10% CaCl$_2$ solution at pH 6.5 with Different Concentrations of Metsorb® HMRG granules.

TABLE 2

| Media weight (g) | Starting Measured Ba concentration (ppm) | End Measured Ba concentration (ppm) | Calculated capacity (g Ba/L media) |
|---|---|---|---|
| 1.0213 | 360 | 14.7 | 44.87 |
| 2.0412 | 360 | 2.62 | 23.15 |
| 3.0195 | 360 | 1.67 | 15.50 |

Figure 2:
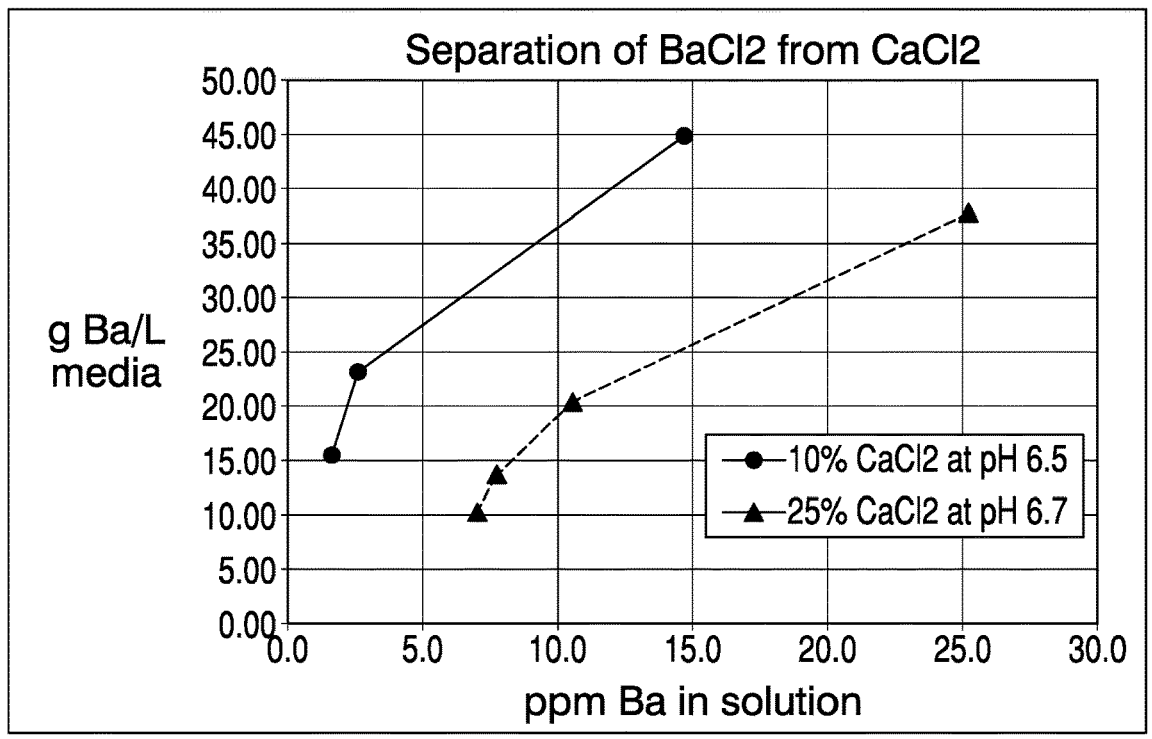
FIG. 2 is a graph showing the comparison of equilibrium removal of $BaCl_2$ from a 10% and 25% $CaCl_2$ according to Example 2.

FIG. 2 shows a comparison of equilibrium removal of BaCl$_2$ from a 10% and 25% CaCl$_2$ solution at room temperature and pH 6.5 with Metsorb® HMRG granules and similar starting concentrations.

Example 3

This example demonstrates that the pH of the CaCl$_2$ solution does have an impact on the equilibrium capacity. The Metsorb® HRMG granules have a natural pH near 6.5 since it is designed for operation in drinking water not a brine solution. The preferred embodiment is near pH 6.5. The separation of Ba is still feasible at a wide range of pHs with test results available between pH 3 and pH 9. The stability of the media would be of concern for long term operation outside that pH range.

Following the same procedure used in Example 1, a series of tests were done with $BaCl_2$ in 10% $CaCl_2$ solutions. In Table 3, the results are shown for a 10% $CaCl_2$ solution held at pH 6.5 and spiked with 136 ppmw Ba. Table 4, shows the same type of experiment at pH 2.9 and Table 5 shows the results at pH 9.4.

Table 3. Summary of Conditions and Results from the Treatment of 10% $CaCl_2$ solution at pH 6.5 with Different Concentrations of Metsorb® HMRG granules.

TABLE 3

| Media weight (g) | Starting Measured Ba concentration (ppm) | End Measured Ba concentration (ppm) | Calculated capacity (g Ba/L media) |
|---|---|---|---|
| 1.0217 | 136 | 4.55 | 16.80 |
| 2.0069 | 136 | 2.06 | 8.69 |
| 3.0704 | 136 | 1.63 | 5.75 |

Table 4. Summary of Conditions and Results from the Treatment of 10% $CaCl_2$ solution at pH 2.9 with Different Concentrations of Metsorb® HMRG granules.

TABLE 4

| Media weight (g) | Starting Measured Ba concentration (ppm) | End Measured Ba concentration (ppm) | Calculated capacity (g Ba/L media) |
|---|---|---|---|
| 1.0874 | 41 | 4.94 | 4.35 |
| 2.0652 | 41 | 2.45 | 2.47 |
| 3.0141 | 41 | 2.21 | 1.68 |
| 4.0573 | 41 | 2.04 | 1.24 |

Table 5. Summary of Conditions and Results from the Treatment of 10% $CaCl_2$ solution at pH 9.4 with Different Concentrations of Metsorb® HMRG granules.

TABLE 5

| Media weight (g) | Starting Measured Ba concentration (ppm) | End Measured Ba concentration (ppm) | Calculated capacity (g Ba/L media) |
|---|---|---|---|
| 1.0649 | 35 | 5.47 | 3.63 |
| 2.0219 | 35 | 2.69 | 2.08 |
| 3.0064 | 35 | 2.22 | 1.42 |

Figure 3:
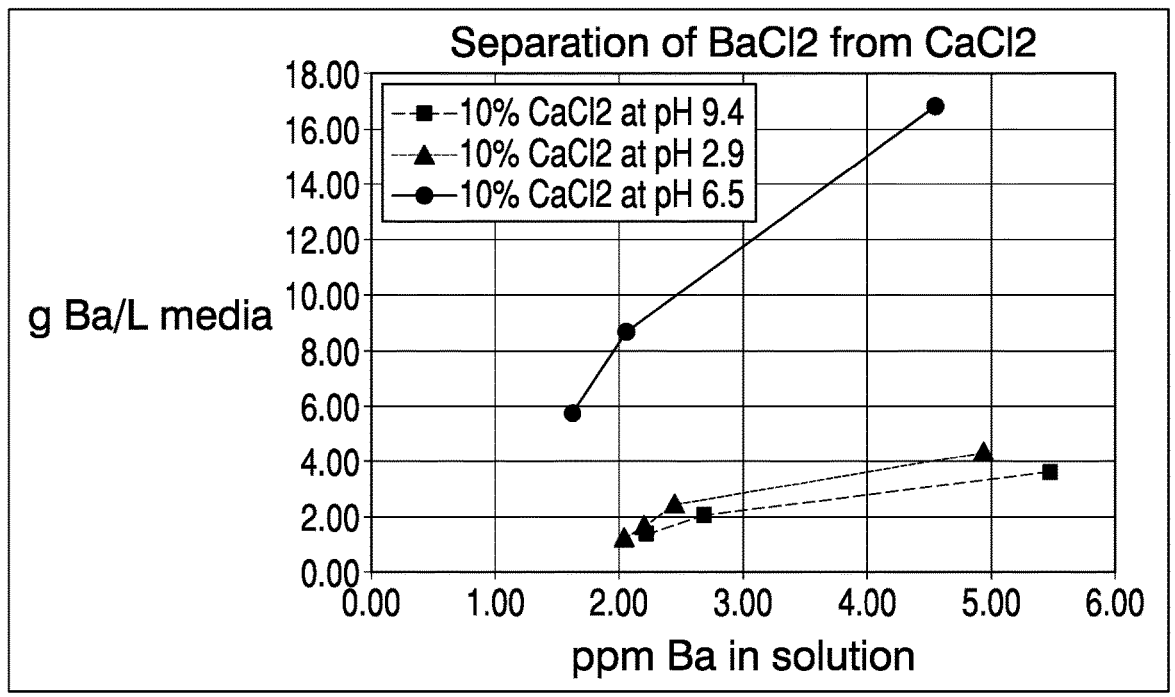
FIG. 3 is a graph summarizing the conditions and results from the treatment of 10% $CaCl_2$ solution at pH 6.5 with different concentrations of Metsorb® HMRG granules according to Example 3.

FIG. 3 shows a comparison of equilibrium removal of $BaCl_2$ from a 10% $CaCl_2$ solution at room temperature at a range of starting pHs with Metsorb® HMRG granules and similar starting concentrations.

Another common impurity found in $CaCl_2$ solution (and dry $CaCl_2$) is $SrCl_2$. The presence of $SrCl_2$ does not appear to impact the removal or capacity for $BaCl_2$, but the $SrCl_2$ is also not removed. The other expected impurity, $RaCl_2$ that could be present in $CaCl_2$ solutions might be expected to be removed in this process, but has not be determined at this time.

Example 4

Figure 4:
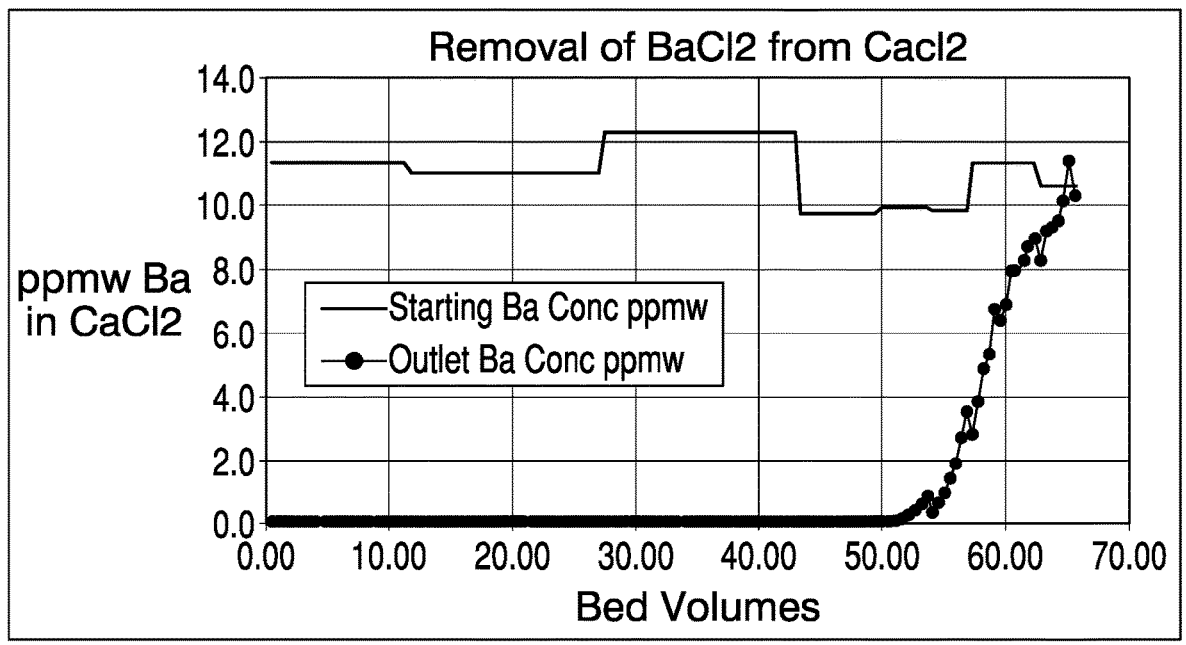
FIG. 4 is a graph showing the results from Example 4.

This Example demonstrates that the Metsorb® HRMG granules can be loaded into a column to allow for the treatment of a CaCl2 solution continuously. In this example, the Metsorb® HRMG granules were loaded into a chromatography column and allowed to equilibrate at pH 6.5 using standard laboratory practices. A series of stock solutions of 10 wt % CaCl2 were prepared using CaCl2*2H2O and DI water. The solution was spiked with 10 ppmw Ba, added as BaCl2*2H2O. Each solution was adjusted to pH 6.5 with NaOH before introduction to the column. CaCl2 brine was pumped downflow through the column at a flow rate of 0.5 BV/hr to allow the large sized granules to remove the BaCl2 effectively. The series of stock solutions were pumped through the bed until the inlet and outlet Ba concentrations were approximately equal. As shown in FIG. 4, for the first 50 Bed Volumes (BV), the Ba concentration was <100 ppbw in the outlet CaCl2 solution. As more CaCl2 brine was passed through the column, the measured outlet Ba concentration continued to rise until it reached an equilibrium value at 65 BV. This example shows that BaCl2 can be removed to very low concentrations in CaCl2 brine solutions allowing for purification to levels suitable for UTS applications or other types of application where low Ba levels are required without requiring a crystallization step and the high energy requirements needed.

What is claimed is:

1. A method for separating BaCl2 from a CaCl2 brine solution comprising contacting a titanium containing material with a BaCl2 containing CaCl2 brine solution, wherein the titanium containing material comprises TiO2.

2. The method of claim 1, wherein the titanium containing material is hydrated.

3. The method of claim 1, wherein the titanium containing material further comprises Ti(OH)4.

4. The method of claim 1, wherein the titanium containing material comprises granules.

5. The method of claim 1, wherein the titanium containing material comprises powder.

6. The method of claim 1, wherein the titanium containing material and the $CaCl_2$ brine solution are mixed together.

7. The method of claim 1, wherein the $CaCl_2$ brine solution is passed through a column packed with the titanium containing material in a granular form.

8. The method of claim 1, wherein the $CaCl_2$ brine solution is maintained at a pH from about 3 to about 9.

9. The method of claim 8, wherein the $CaCl_2$ brine solution is maintained at a pH from about 5.9 to about 6.9.

10. The method of claim 9, wherein the $CaCl_2$ brine solution is maintained at a pH of about 6.5.

11. The method of claim 1, wherein the $CaCl_2$ brine solution has a concentration between about 10 wt. % to about 30 wt. % $CaCl_2$ at ambient temperature, based on the total weight of the brine solution.

12. The method of claim 1, wherein the $CaCl_2$ brine solution is contacted with the titanium containing material at a temperature between 10° C. and 75° C.

13. The method of claim 12, wherein the $CaCl_2$ brine solution is contacted with the titanium containing material at a temperature between 20° C. and 65° C.

14. The method of claim 1, wherein the titanium containing material has a surface area above 180 m²/g.

* * * * *